US008983464B2

(12) United States Patent
Mori

(10) Patent No.: US 8,983,464 B2
(45) Date of Patent: Mar. 17, 2015

(54) COMMUNICATION TERMINAL AND COMMUNICATION CONTROL METHOD

(75) Inventor: Daisuke Mori, Kanagawa (JP)

(73) Assignee: Kyocera Corporation, Kyoto (JP)

(*) Notice: Subject to any disclaimer, the term of this patent is extended or adjusted under 35 U.S.C. 154(b) by 524 days.

(21) Appl. No.: 12/597,156

(22) PCT Filed: Apr. 25, 2008

(86) PCT No.: PCT/JP2008/058122
§ 371 (c)(1),
(2), (4) Date: Feb. 11, 2010

(87) PCT Pub. No.: WO2008/139903
PCT Pub. Date: Nov. 20, 2008

(65) Prior Publication Data
US 2010/0184459 A1    Jul. 22, 2010

(30) Foreign Application Priority Data
Apr. 26, 2007   (JP) ................ 2007-117595

(51) Int. Cl.
*H04W 4/00*   (2009.01)
*H04W 48/18*  (2009.01)
*H04W 88/06*  (2009.01)

(52) U.S. Cl.
CPC .............. *H04W 48/18* (2013.01); *H04W 88/06* (2013.01)
USPC .................... 455/435.2; 455/435.3

(58) Field of Classification Search
USPC ........... 455/522, 435.2, 436, 437, 451, 452.2
See application file for complete search history.

(56) References Cited

U.S. PATENT DOCUMENTS

2005/0266904 A1  12/2005  Kitaji et al.
2006/0281486 A1* 12/2006  Ngai et al. ................. 455/552.1

FOREIGN PATENT DOCUMENTS

| JP | 2005-184355 | 7/2005 |
| JP | 2005-347791 | 12/2005 |
| JP | 2006-303733 | 11/2006 |
| WO | WO-2006-124550 | 11/2006 |

OTHER PUBLICATIONS

JP2007-117595 Notice of Reasons for Rejection mailed Sep. 4, 2012.

* cited by examiner

*Primary Examiner* — Tu X Nguyen
(74) *Attorney, Agent, or Firm* — Duane Morris LLP

(57) ABSTRACT

It is possible to provide a radio communication terminal and a communication control method which can reduce the time of a out-of-cell state and perform reselection while continuing a wait operation. A mobile telephone (1) includes: a main communication unit (40) which transmits and receives a signal to/from one of communication systems via a main antenna (410); a sub communication unit (50) which receives a signal from one of the communication systems via a sub antenna (510); and a CPU (60) which switches the communication system to be used by the main communication unit (40) and the sub communication unit (50). When performing a predetermined process for selecting and capturing a priority system while the main communication unit (40) is waiting for a non-priority system, the sub communication unit (50) waits for the non-priority system and the main communication unit (40) captures the priority system.

17 Claims, 14 Drawing Sheets

FIG.6

PRIORITY LEVEL TABLE

| PRIORITY LEVEL | BAND CLASS (FREQUENCY BAND) | CLASSIFICATION |
|---|---|---|
| 1 | 6(2GHz) | PRIMARY |
| 2 | 0 (NEW 800 MHz) | PRIMARY |
| 3 | 0 (NEW 800 MHz) | SECONDARY |
| 4 | 3 (OLD 800 MHz) | PRIMARY |
| 5 | 3 (OLD 800 MHz) | SECONDARY |

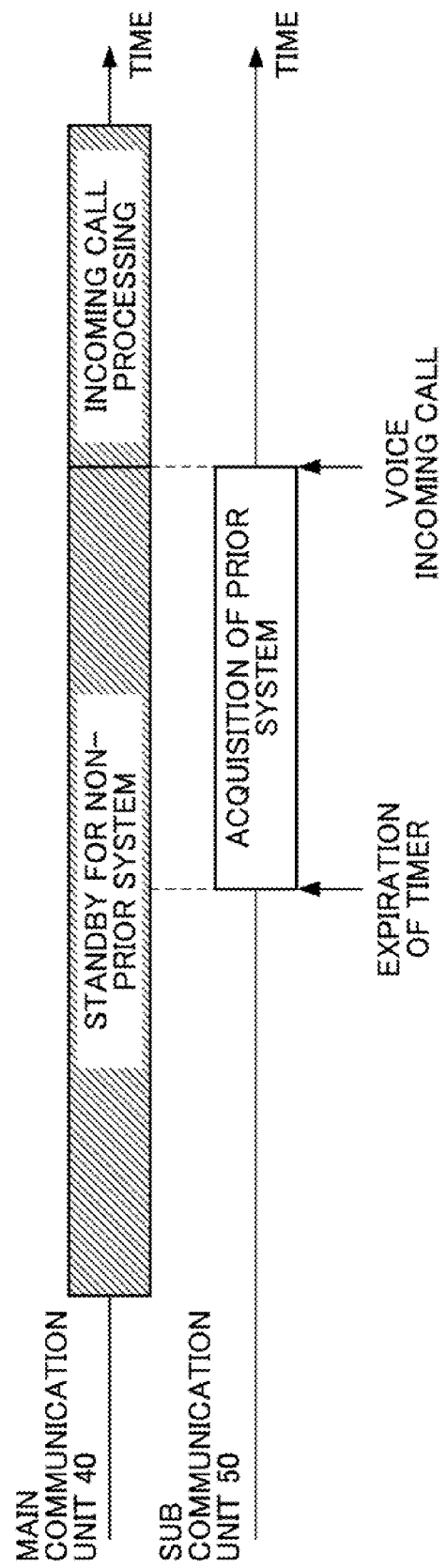

US 8,983,464 B2

COMMUNICATION TERMINAL AND COMMUNICATION CONTROL METHOD

CROSS-REFERENCE TO RELATED APPLICATIONS

This application is a U.S. National Phase Application of International Application No. PCT/JP2008/058122 filed on Apr. 25, 2008, which claims priority to Japanese Patent Application No. 2007-117595 filed Apr. 26, 2007, the disclosures of which are incorporated herein by reference in their entirety.

TECHNICAL FIELD

The present invention relates to a communication terminal and a communication control method for performing radio communication with a plurality of communication systems.

BACKGROUND ART

Conventionally, in radio communication terminals such as a cellular telephone device, communication is performed by selecting one of a plurality of communication systems (for example, communication systems with different frequency bands or different base stations) and establishing synchronization therewith. Here, since the plurality of communication systems are prioritized, the radio communication terminal takes measures for communicating with a communication system with a higher priority.

For example, in a case in which a radio communication terminal performing re-selection has established synchronization with a non-prior system and is in a standby state, the radio communication terminal tries acquisition of a communication system with a higher priority than that of this non-prior system for a certain time period. On this occasion, if reception quality of a prior system signal coming from another base station is satisfactory, synchronization is established with this prior system, and the state transitions to a standby state.

Moreover, in recent years, many types of radio communication terminals with a sub antenna in addition to a main antenna have been introduced. More and more of these radio communication terminals are made so as to employ a method for receiving a channel (e.g., a standby paging channel for audio communication) by the sub antenna instead of the main antenna, by using an SHDR (Simultaneous Hybrid Dual Receive) function.

For example, Patent Document 1 discloses a module for performing communication in which two antennas acquire different channels at the same time, and a channel with higher reception sensitivity among the two received channels is used.

Patent Document 1: Japanese Unexamined Patent Application, First Publication No. 2005-184355

DISCLOSURE OF THE INVENTION

Problems to be Solved by the Invention

However, in the radio communication terminal including two antennas as described above, the sub antenna is auxiliary to the main antenna, and the current situation is that application thereof is limited such that incoming call (CDMA2000_1x) standby is performed during diversity reception or EV-DO (Evolution Data Only) reception.

Here, during the aforementioned re-selection operation, the main antenna conventionally performs acquisition of a prior system. As a result, the synchronization with the non-prior system, which had been in a standby state before starting the re-selection, is interrupted. Consequently, since this leads to a state of no service which temporarily disables communication, a method for avoiding such a state of no service during re-selection is desired.

Accordingly, an object of the present invention is to provide a radio communication terminal and a communication control method that enable re-selection while continuing a standby operation and reducing a period of time for such a state of no service.

Means for Solving the Problems

According to a first aspect of the present invention, a communication terminal includes: a first communication unit that transmits and receives a signal with one of a plurality of communication systems via a first antenna; a second communication unit that receives a signal from one of the plurality of communication systems via a second antenna; and a control unit that switches a communication system to be used in each of the first communication unit and the second communication unit, in which, in a case of performing predetermined processing to select and acquire another communication system while the first communication unit is on standby for a first communication system, the second communication unit is on standby for the first communication system, and the first communication unit acquires a second communication system with a higher priority than a priority of the first communication system.

According to a second aspect of the present invention, a communication terminal includes: a first communication unit that transmits and receives a signal with one of a plurality of communication systems via a first antenna; a second communication unit that receives a signal from one of the plurality of communication systems via a second antenna; and a control unit that switches a communication system to be used in each of the first communication unit and the second communication unit, in which, in a case of performing predetermined processing to select and acquire another communication system while the first communication unit is on standby for a first communication system, the first communication unit continues the standby for the first communication system, and the second communication unit acquires a second communication system with a higher priority than a priority of the first communication system.

According to a third aspect of the present invention, in the communication terminal as described in the first aspect, in a case in which acquisition of the second communication system has succeeded, it is preferable that the predetermined processing starts standby for the second communication system in the first communication unit.

According to a fourth aspect of the present invention, in the communication terminal as described in the second aspect, in a case in which acquisition of the second communication system has succeeded, it is preferable that the predetermined processing starts standby for the second communication system in the first communication unit.

According to a fifth aspect of the present invention, in the communication terminal as described in the third aspect, it is preferable that the predetermined processing is re-selection processing.

According to a sixth aspect of the present invention, in the communication terminal as described in the fourth aspect, it is preferable that the predetermined processing is re-selection processing.

According to a seventh aspect of the present invention, in the communication terminal as described in the first aspect, in a case in which acquisition of the second communication system has failed, it is preferable that the first communication unit performs again the standby for the first communication system.

According to an eighth aspect of the present invention, in the communication terminal as described in the second aspect, in a case in which acquisition of the second communication system has failed, it is preferable that the first communication unit continues the standby for the first communication system.

According to a ninth aspect of the present invention, in the communication terminal as described in the first aspect, it is preferable that the second communication unit monitors a paging channel of the first communication system, while the first communication unit is performing acquisition processing for the second communication system.

According to a tenth aspect of the present invention, in the communication terminal as described in the second aspect, it is preferable that the first communication unit monitors a paging channel of the first communication system, while the second communication unit is performing acquisition processing for the second communication system.

According to an eleventh aspect of the present invention, in the communication terminal as described in the ninth aspect, in a case in which the second communication unit detects an incoming call while the first communication unit is performing acquisition processing for the second communication system, it is preferable that the first communication unit performs incoming call processing in the first communication system.

According to a twelfth aspect of the present invention, in the communication terminal as described in the eleventh aspect, in a case in which the second communication unit detects an incoming call, it is preferable that the incoming call processing is performed after stopping the acquisition processing for the second communication system by the first communication unit.

According to a thirteenth aspect of the present invention, in the communication terminal as described in the tenth aspect, in a case in which the first communication unit detects an incoming call while the second communication unit is performing acquisition processing for the second communication system, it is preferable that the first communication unit continues incoming call processing in the first communication system.

According to a fourteenth aspect of the present invention, in the communication terminal as described in the thirteenth aspect, in a case in which the first communication unit detects an incoming call, it is preferable that the acquisition processing for the second communication system by the second communication unit is stopped.

According to a fifteenth aspect of the present invention, in the communication terminal as described in the first aspect, in a case in which an outgoing call operation occurs while the first communication unit is performing acquisition processing for the second communication system, it is preferable that the first communication unit performs outgoing call processing in the first communication system after stopping acquisition processing for the second communication system by the first communication unit.

According to a sixteenth aspect of the present invention, in the communication terminal as described in the second aspect, in a case in which an outgoing call operation occurs while the second communication unit is performing acquisition processing for the second communication system, it is preferable that acquisition processing for the second communication system by the second communication unit is stopped, and the first communication unit performs outgoing call processing in the first communication system.

According to a seventeenth aspect of the present invention, in a communication control method of a communication terminal including a first communication unit that transmits and receives a signal with one of a plurality of communication systems via a first antenna, and a second communication unit that receives a signal from one of the plurality of communication systems via a second antenna, the method includes the steps of: performing predetermined processing of selecting and acquiring another communication system while the first communication unit is on standby for a first communication system; and switching the standby for the first communication system to the second communication unit, and causing the first communication unit to perform acquisition of a second communication system with a higher priority than a priority of the first communication system, in a case in which the predetermined processing is performed.

Effects of the Invention

According to the present invention, it is possible to provide a radio communication terminal and a communication control method that enable re-selection while continuing a standby operation.

BRIEF DESCRIPTION OF THE DRAWINGS

FIG. 6 is a table showing a priority level table according to an example of the preferred embodiment of the present invention;

FIG. 14 is a diagram showing a flow of operations of a case in which a voice incoming call has been captured while performing re-selection by the sub communication unit in the cellular telephone device according to an example of the preferred embodiment of the present invention.

Figure 1:
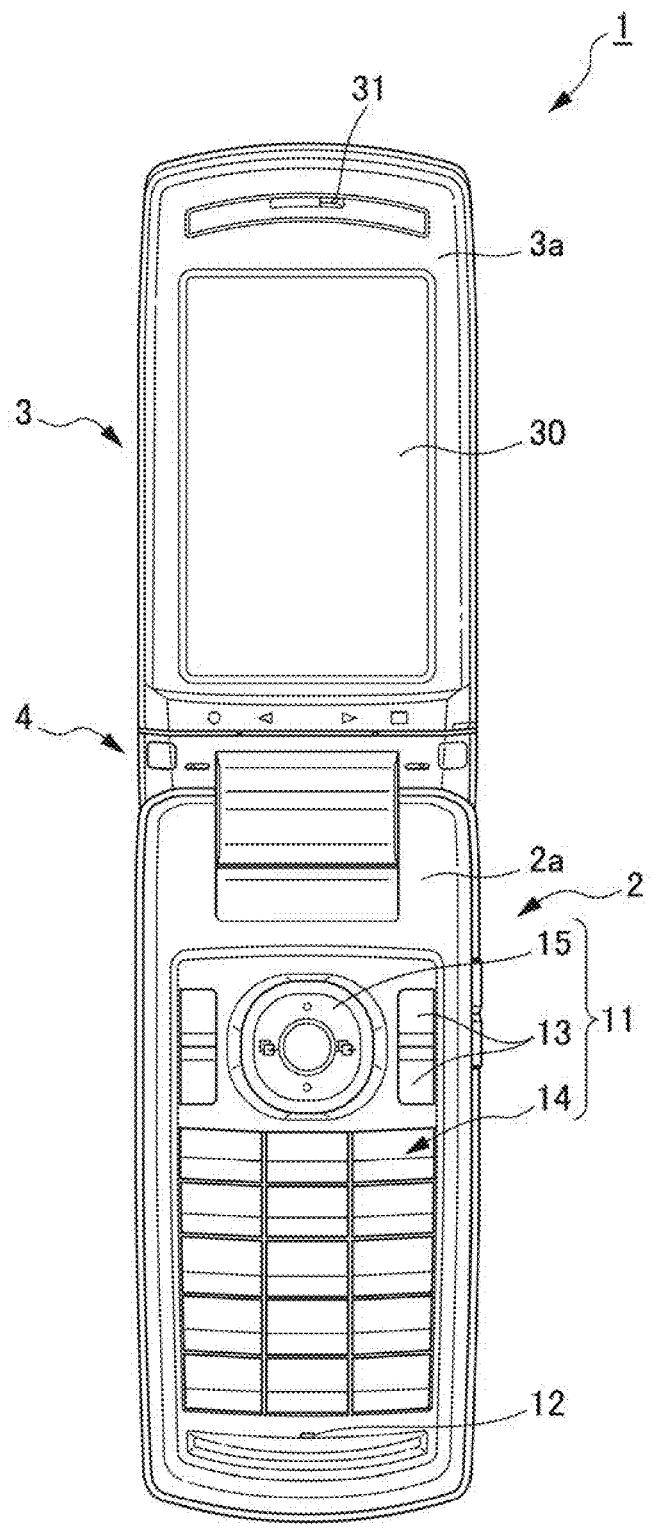
FIG. 1 is a front view of a cellular telephone device in an opened state according to an example of a preferred embodiment of the present invention.

EXPLANATION OF REFERENCE NUMERALS 1 cellular telephone device
40 main communication unit
50 sub communication unit
60 CPU
410 main antenna
420 branching filter
430 power amplifier
440 transmitting circuit unit
450 receiving circuit unit
510 sub antenna
550 receiving circuit unit
610 antenna control unit
620 channel processor

PREFERRED MODE FOR CARRYING OUT THE INVENTION

A description is provided hereinafter regarding an example of a preferred embodiment according to the present invention, based on the drawings. It should be noted that, although a cellular telephone device is hereinafter described as a radio communication terminal, the present invention is not limited thereto, and it may be a PDA (Personal Digital Assistant), a portable navigation device, a notebook PC or the like.

Structure of Cellular Telephone Device 1

A basic structure of a cellular telephone device 1 is described with reference to FIGS. 1 to 3. FIG. 1 shows a front view of a state in which the cellular telephone device 1 is opened (a first opened state). In addition, FIG. 2 (A) shows a left side view of a state in which the cellular telephone device 1 is opened, and FIG. 2 (B) shows a right side view of a state in which the cellular telephone device 1 is opened. Furthermore, FIG. 3 shows a rear view of a state in which the cellular telephone device 1 is opened.

The cellular telephone device 1 includes an operation unit side body 2 and a display unit side body 3. The operation unit side body 2 and the display unit side body 3 are connected via a connecting portion 4 including a 2-axis hinge mechanism. The cellular telephone device 1 can be transformed into an opened state and a closed state, and the display unit side body 3 can be switched between a front side state and a back side state in the opened state and the closed state, respectively.

Here, the closed state is a state in which both bodies are disposed so as to be mutually superimposed, and the opened state is a state in which both bodies are disposed so as not to be mutually superimposed. The front side state in the opened state is a state in which a main display 30 disposed on a surface 3a in the display unit side body 3 to be described later and an operation key set 11 disposed in a front case 2a in the operation unit side body 2 are disposed so as to face the same side. The back side state is a state in which the main display 30 in the display unit side body 3 and the operation key set 11 in the operation unit side body 2 are disposed so as to face opposite sides. The front side state in the closed state is a state in which the main display 30 in the display unit side body 3 is disposed so as to face the operation key set 11 in the operation unit side body 2. The back side state in the closed state is a state in which the main display 30 in the display unit side body 3 is disposed so as to be exposed and not face the operation key set 11 in the operation unit side body 2.

An outer surface of the operation unit side body 2 is configured with a front case 2a and a rear case 2b. The operation unit side body 2 is configured to expose, on the front case 2a side, both the operation key set 11 and a sound input unit (microphone) 12 where the sound of the user of the cellular telephone device 1 is input when conversing. Here, the operation key set 11 is configured with: function setting operation keys 13 for operating various functions such as for various settings, a telephone number directory function and a mail function; input operation keys 14 for inputting digits of a telephone number and characters for mail; and selection operation keys 15 that performs selection of the various operations and scrolls up, down, left and right. Moreover, a microphone 12 is disposed to an outer end side that is opposite to the connecting portion 4 side in a longitudinal direction of the operation unit side body 2. In other words, the microphone 12 is disposed to one outer end side of the cellular telephone device 1 in the opened state.

In addition, predetermined functions are assigned (key assignment) to each key configuring the operation key set 11 in accordance with a transformation state such as the opened/closed state and the front/back side state of the operation unit side body 2 and the display unit side body 3, and the type of application that is running. An operation corresponding to a function assigned to each key is executed by the user depressing each key configuring the operation key set 11 of the cellular telephone device 1.

As shown in FIG. 2(A), an interface 16 for transmitting and receiving data with an external device (e.g., a host device), a headphone/microphone terminal 17, a detachable external memory interface 18, and a charging terminal 19 for recharging a battery are provided on one side of the operation unit side body 2. It should be noted that the interface 16, the headphone/microphone terminal 17 and the interface 18 are covered with a detachable cap to protect from dust when not in use.

As shown in FIG. 2(B), a pair of side keys 20, an operation key 21 used when capturing an image, and an antenna 22 for receiving a broadcast wave, in which a reception angle of waves can be adjusted, are provided on another side of the operation unit side body 2. Predetermined functions are assigned (key assignment) to the side keys 20 in accordance with a transformation state such as the opened/closed state and the front/back side state of the operation unit side body 2 and the display unit side body 3, and the type of application that is running. Here, similarly to the aforementioned case, an operation corresponding to a function assigned to the side keys 20 is executed by the user depressing the side keys 20 of the cellular telephone device 1.

As shown in FIG. 3, a camera 23 that takes an image of a subject and a light 24 that irradiates light on the subject are disposed so as to be exposed in the rear case 2b of the operation unit side body 2. The camera 23 and the light 24 are disposed to the connecting portion 4 side in the operation unit side body 2. Moreover, an opening for mounting the battery in a battery accommodating portion to be described later in detail is formed in the rear case 2b of the operation unit side body 2, and a battery lid 25 is disposed so as to cover the opening.

Figure 2:
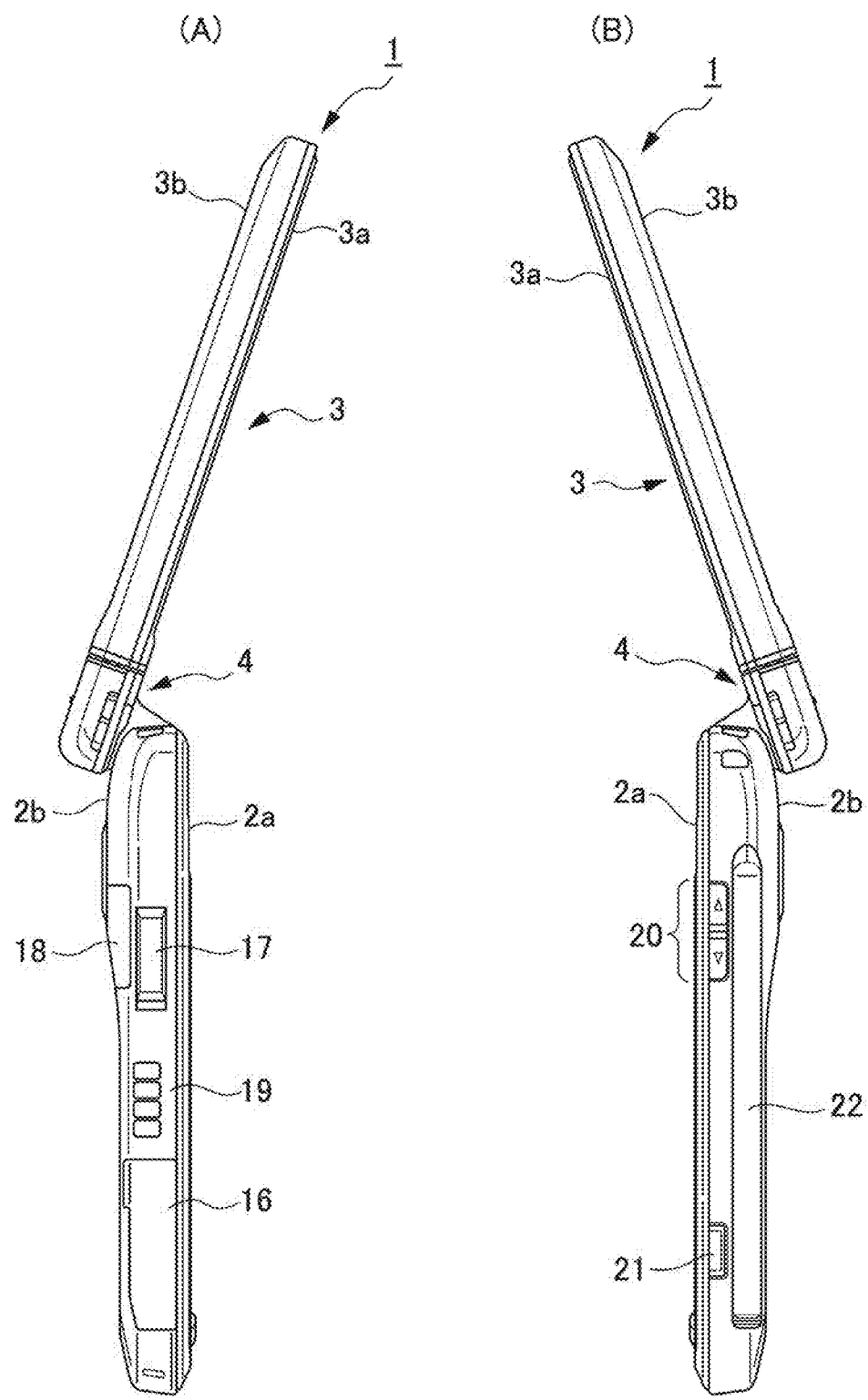
FIG. 2 is a side view of the cellular telephone device in an opened state according to an example of the preferred embodiment of the present invention.
Figure 3:
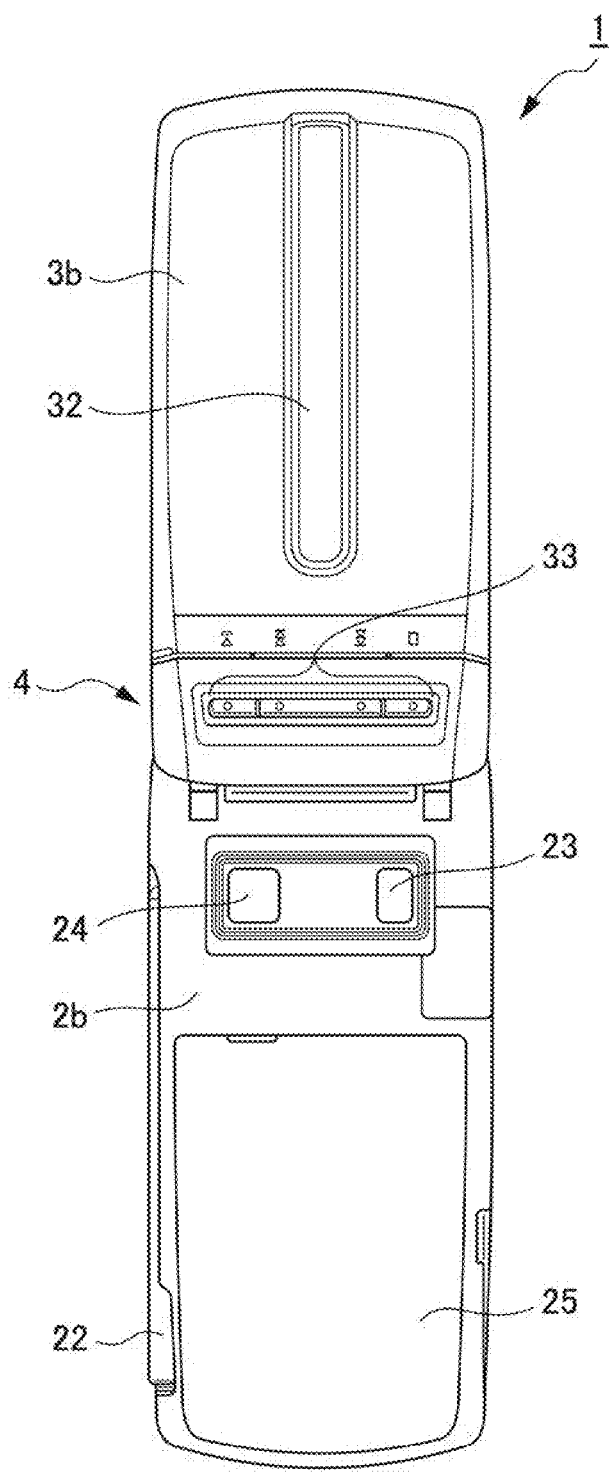
FIG. 3 is a rear view of the cellular telephone device in an opened state according to an example of the preferred embodiment of the present invention.

Furthermore, as shown in FIGS. 1 to 3, an upper end portion of the operation unit side body 2 and a lower end portion of the display unit side body 3 are connected by the connecting portion 4 including the 2-axis hinge mechanism. As shown in FIG. 3, a secondary operation key set 33 is disposed on one surface (rear surface) of the connecting portion 4 in a row in a width direction (lateral direction) of the cellular telephone device 1. Predetermined functions are assigned (key assignment) to each key configuring the secondary operation key set 33 in accordance with a transformation state such as the opened/closed state and the front/back side state of the operation unit side body 2 and the display unit side body 3, and the type of application that is running. An operation corresponding to a function assigned to each key is executed by the user depressing each key configuring the secondary operation key set 33 of the cellular telephone device 1.

Moreover, an outer surface of the display unit side body 3 is configured with a front case 3a and a rear case 3b. As shown in FIG. 1, the main display 30 of a predetermined shape for displaying a variety of information and a sound output unit (speaker) 31 that outputs sound of the other party of the conversation are disposed so as to be exposed on the front case 3a of the display unit side body 3. Here, the speaker 31 is disposed to an outer end side that is opposite to the connecting portion 4 in a longitudinal direction of the display unit side body 3. In other words, the speaker 31 is disposed to another outer end side, which is opposite to the microphone 12, of the cellular telephone device 1 in the opened state.

In addition, as shown in FIG. 3, a sub-display 32 for displaying a variety of information is disposed so as to be exposed on the rear case 3b of the display unit side body 3. Each of the main display 30 and the sub-display 32 is configured with a liquid crystal display panel, a drive circuit that drives the liquid crystal display panel, and a light source unit such as a backlight that irradiates light from the back surface side of the liquid crystal display panel.

It should be noted that, although the cellular telephone device 1 is described as being foldable by the connecting portion 4 in the present embodiment, it is not limited thereto. For example, instead of such a flip type, the cellular telephone device 1 may be of: a slider type in which one body slides to one direction from a state in which the operation unit side body 2 and the display unit side body 3 are mutually superimposed; a rotating type (turning type) in which one body is rotated around an axis line along the direction in which the operation unit side body 2 and the display unit side body 3 are superimposed; or a straight type in which the operation unit side body 2 and the display unit side body 3 are disposed in a single body without a connecting portion.

Functional Block Diagram of Cellular Telephone Device 1

Figure 4:
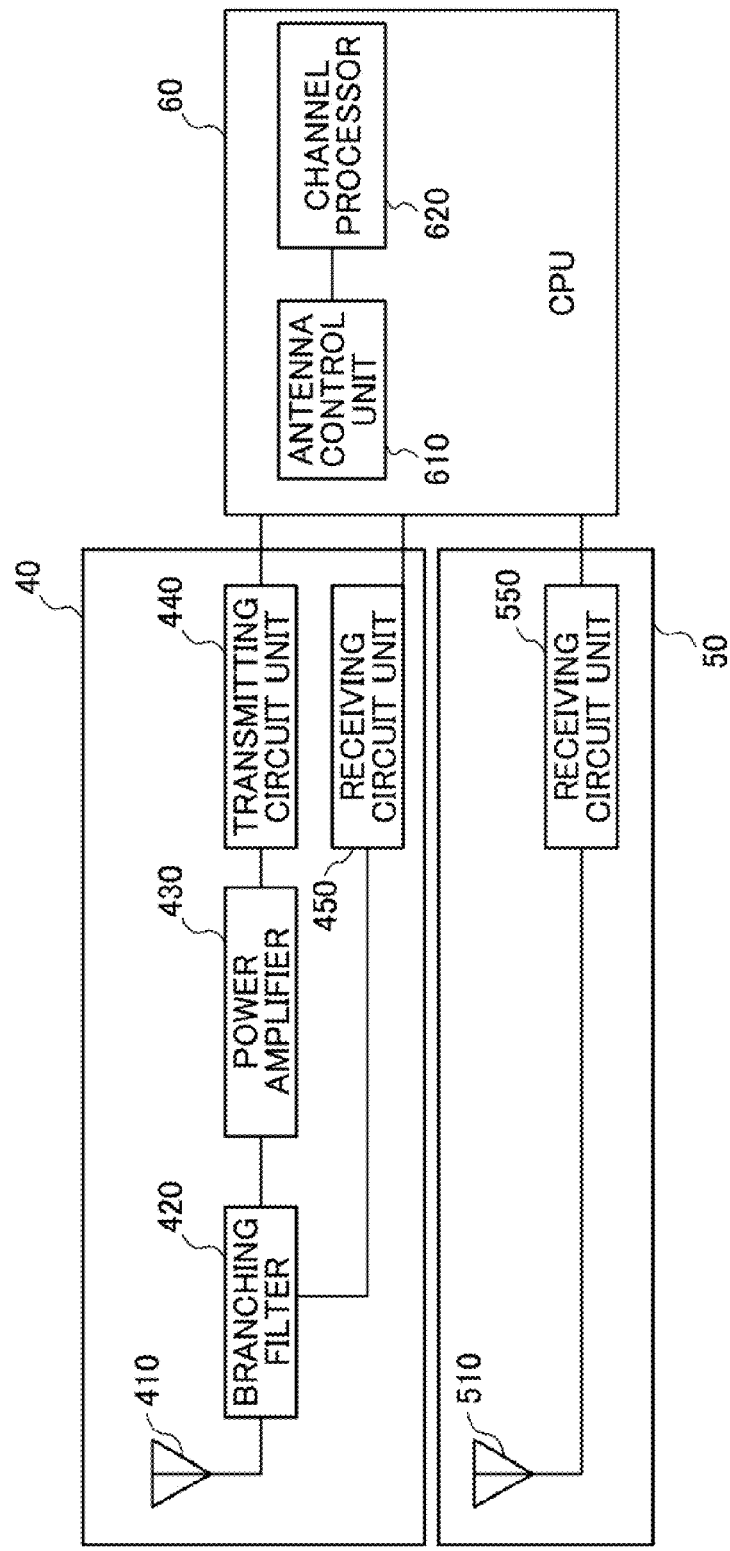
FIG. 4 is a block diagram showing each function of the cellular telephone device according to an example of the preferred embodiment of the present invention.

FIG. 4 is a block diagram showing each function of the cellular telephone device 1 according to an example of a preferred embodiment of the present invention.

The cellular telephone device 1 includes: a main communication unit (first communication unit) 40 that is capable of transmitting and receiving signals; a sub communication unit (second communication unit) 50 that is capable of receiving signals; and a CPU (control unit) 60. With the above units collaborating with each other, the cellular telephone device 1 selects one of a plurality of communication systems, and communicates sound and data.

Here, the communication system refers to, for example, an adapted frequency in a communication method that can be used by the cellular telephone device 1. The cellular telephone device 1 is capable of transmitting and receiving radio signals in a plurality of frequency bands, and more specifically is capable of communication by using an old 800 MHz band, a new 800 MHz band and a 2 GHz band.

It should be noted that, as an identification number for identifying a frequency band between a base station and the cellular telephone device 1, a code as referred to as a band class, which is defined by the 3GPP2 (3rd Generation Partnership Project 2), is assigned to each of the aforementioned communication systems with different frequency bands.

For example, the band class is used for a purpose such as notifying the cellular telephone device 1 of a communication system that is present in the neighborhood of the cellular telephone device 1, which is in a neighborhood base station list (Neighbor List) or the like, as part of information notified from one base station to the cellular telephone device 1. It should be noted that the old 800 MHz band is classified as a band class 3, the new 800 MHz band as a band class zero, and the 2 GHz band as a band class 6, respectively.

Moreover, each band class may be further divided into two frequency bands (primary and secondary bands) in some cases. In this way, the cellular telephone device 1 selects from among various types of communication systems (frequency bands) for performing communication.

The main communication unit 40 includes a main antenna 410, a branching filter 420, a power amplifier 430, a transmitting circuit unit 440 and a receiving circuit unit 450, and is responsible for transmitting and receiving signals with the aforementioned communication systems.

A transmission signal being output by the transmitting circuit unit 440 is amplified by the power amplifier 430, is passed through the branching filter 420, and is transmitted by radio to a communication system via the main antenna 410. In addition, a received signal that has been received via the main antenna 410 is input to the receiving circuit unit 450, and the CPU 60 performs processing in accordance with the received signal.

The sub communication unit 50 includes a sub antenna 510 and a receiving circuit unit 550, and is responsible for receiving signals from the aforementioned communication systems. The received signal that has been input to the receiving circuit unit 550 via the sub antenna 510 is processed by the CPU 60.

The CPU 60 includes an antenna control unit 610 and a channel processor 620. The antenna control unit 610 performs frequency allocation processing in the main communication unit 40 and the sub communication unit 50 in accordance with a command signal from the channel processor 620. Here, since the receiving circuit units 450 and 550 each have a local oscillator, the CPU 60 can select different frequencies at the same time.

The channel processor 620 controls each of the main communication unit 40 and the sub communication unit 50, whereby the cellular telephone device 1 implements re-selection processing according to the present invention as described later.

Here, although the communication systems refer to band classes that are not only different in frequency but also slightly different in protocol, a description is hereinafter made by way of difference in frequency for simplicity of explanation.

Re-selection Operation

Figure 5:
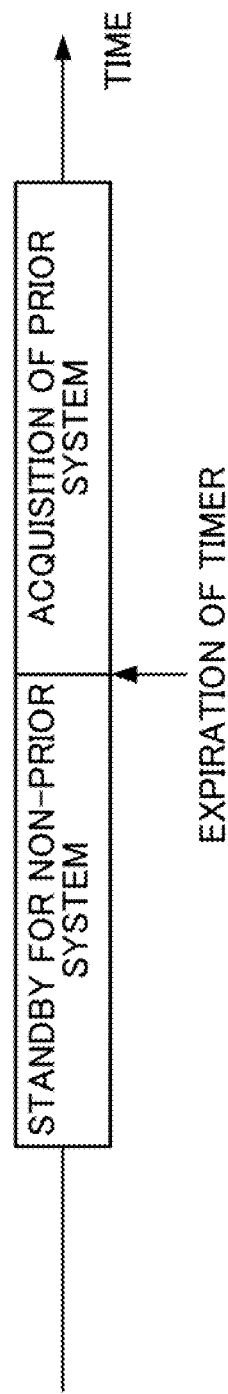
FIG. 5 is a diagram showing a flow of a re-selection operation by a communication terminal.

FIG. 5 is a diagram showing an example of a flow of a re-selection operation by a communication terminal.

While performing standby for a non-prior system, the communication terminal starts acquisition processing for a prior system upon expiration of a timer for re-selection. It should be noted that the timer begins the count from the start of the standby, and expires in a predetermined period of time. For example, the timer can be set in advance such that a period of time until the expiration is shortened immediately after an event such as terminating a telephone call. As a result, the communication terminal periodically repeats the re-selection operation, and tries to communicate with a system with a higher priority.

Here, the communication terminal stores priority levels of the communication systems by way of, for example, a priority level table shown in FIG. 6. Combinations of a band class (frequency band) and a primary/secondary classification, which show communication systems, are stored in the priority level table with prioritization thereof. The communication terminal sequentially tries acquisition of a corresponding communication system in accordance with the priority level. In this particular example, when communication with "band class 6" of "primary" at the top priority level (top prior system) is established, subsequent re-selection becomes unnecessary.

It should be noted that, according to the present re-selection method, the communication unit performing standby for a non-prior system performs re-selection (acquisition of a prior system) as shown in FIG. 5, thus a connection with the communication system is cut off while performing the re-selection, and the communication terminal enters a state of no service.

First Embodiment

Figure 7:
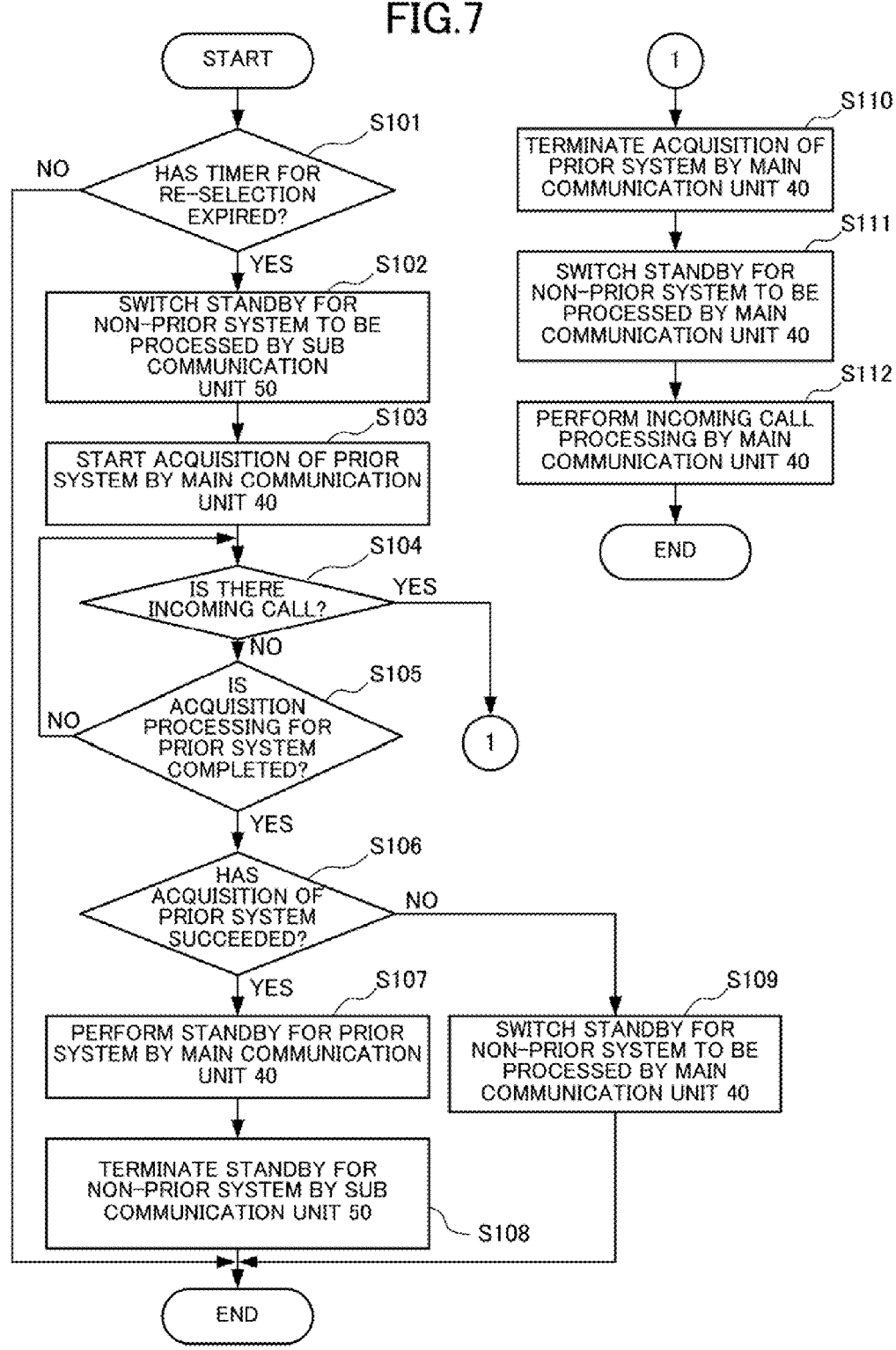
FIG. 7 is a flowchart of a case in which the main communication unit performs re-selection in the cellular telephone device according to an example of the preferred embodiment of the present invention.

FIGS. 7 to 10 are diagrams showing re-selection operations of the cellular telephone device 1 according to an example of a preferred embodiment of the present invention. First, a processing flow is shown in FIG. 7. Here, it is assumed that the cellular telephone device 1 is performing standby for a non-prior system (a communication system other than that at priority level 1).

In Step S101, the CPU 60 determines whether the timer for re-selection has expired. In a case in which the timer has not expired, it is not the timing for re-selection yet, and thus the CPU 60 terminates this processing.

In Step S102, the CPU 60 switches the standby processing for a non-prior system, which is being performed by the main communication unit 40, to the sub communication unit 50. This makes it possible to process other channels by the main communication unit 40, while continuing the standby for a non-prior system.

In Step S103, the CPU 60 starts acquisition of a prior system by the main communication unit 40. More specifically, for example, the CPU 60 sequentially tries acquisition of a communication system with a higher priority level, in the priority level table of FIG. 6, than the priority level of the communication system for which the standby is being performed.

In Step S104, the CPU 60 determines whether there is an incoming call in the non-prior system for which the sub communication unit 50 is performing standby. More specifically, in a case in which the CPU 60 receives incoming data, for example, by paging channel reception of CDMA2000_1x, the processing proceeds to Step S110 for communication to be started with the non-prior system that had the incoming call. In a case in which an outgoing call operation occurs in Step S104 as well, the processing proceeds to Step S110.

In Step S105, the CPU 60 determines whether the acquisition processing for a prior system is completed, with there not being an incoming call in Step S104. When the acquisition processing that started in Step S103 is completed, the CPU 60 proceeds to processing in Step S106 without depending on the success/failure of the acquisition processing. In a case in which the acquisition processing is not completed, the CPU 60 repeats determination of Steps S104 and S105.

In Step S106, the CPU 60 determines whether the acquisition of a prior system that started in Step S103 has succeeded. In a case in which the acquisition has succeeded, and communication with a prior system is possible, the CPU 60 proceeds to processing in Step S107. On the other hand, in a case in which the acquisition has failed, and communication with a prior system is not possible, the CPU 60 proceeds to processing in Step S109.

In Step S107, the CPU 60 starts standby processing for the prior system, which has been determined to be successfully acquired in Step S106, by the main communication unit 40.

In Step S108, upon starting the standby for the prior system in Step S107, the CPU 60 terminates the standby processing for the non-prior system, which has been switched to the sub communication unit 50.

This means that the CPU 60 has succeeded in re-selection of a prior system without interrupting the standby for a non-prior system. As a result, the period of time for the cellular telephone device 1 to be in a state of no service can be reduced to a period of time required for switching to the sub communication unit 50, and standby problems such as missing an incoming call can be reduced.

In Step S109, since the CPU 60 has failed acquisition of a prior system, the standby for the non-prior system, which has been switched to the sub communication unit 50, is switched again to the main communication unit 40.

This enables the CPU 60 to continue the standby for a non-prior system, even in a case in which the re-selection has failed. Moreover, by utilizing the sub communication unit 50, the CPU 60 can try re-selection without interrupting the standby for the communication system with which synchronization has been established.

In Step S110, in response to capturing an incoming call such as a voice call, or an occurrence of outgoing call processing in Step S104, the CPU 60 gives priority to the processing of the incoming/outgoing call, and thus terminates the acquisition processing for a prior system that is being performed by the main communication unit 40.

In Step S111, the CPU 60 switches the standby for the non-prior system, which has been switched to the sub communication unit 50, to the main communication unit 40 again.

In Step S112, the CPU 60 performs, by the main communication unit 40, incoming call processing or outgoing call processing in the non-prior system. This enables the cellular telephone device 1 to perform communication processing such as a voice call, by using the main communication unit 40 that is capable of both of transmission and reception. In other words, the cellular telephone device 1 can continue the standby and monitor for an incoming call (outgoing call), while performing re-selection.

Figure 8:
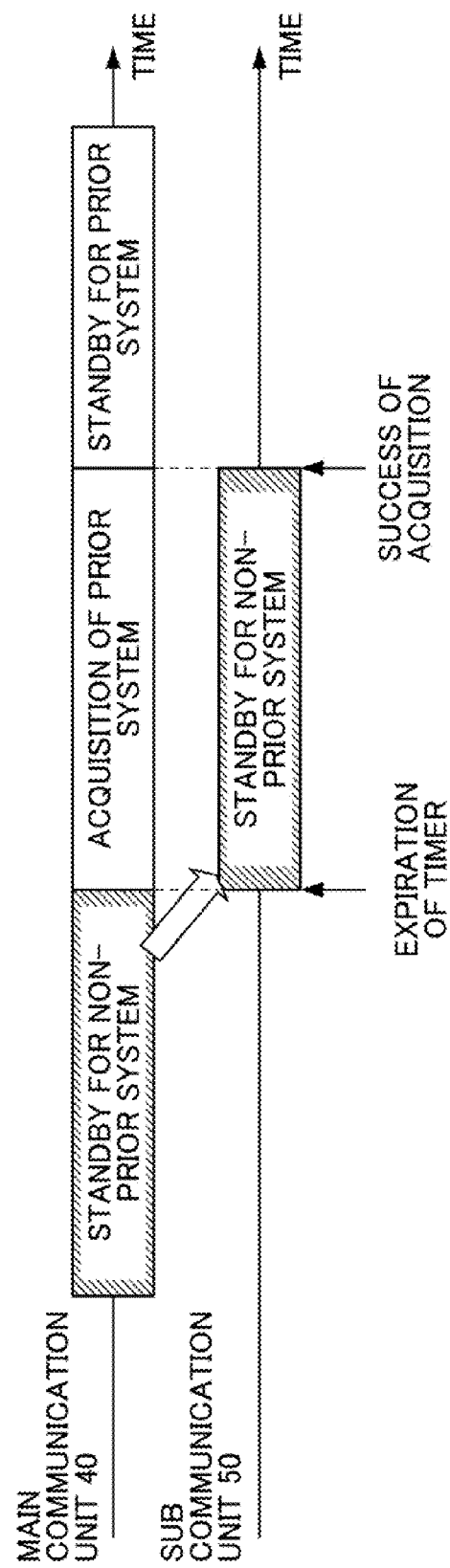
FIG. 8 is a diagram showing a flow of operations of a case in which acquisition of a prior system has succeeded by the main communication unit in the cellular telephone device according to an example of the preferred embodiment of the present invention.

FIG. 8 shows a flow in which the cellular telephone device 1 succeeds in acquisition of a prior system, and proceeds to standby for the prior system.

Upon expiration of the timer, the cellular telephone device 1 switches the standby for a non-prior system to the sub communication unit 50 in order to avoid interrupting the standby for the non-prior system, and performs acquisition (re-selection) of a prior system by the main communication unit 40.

Thereafter, when the main communication unit 40 has succeeded in acquisition of a prior system, the main communication unit 40 starts standby for the prior system.

Figure 9:
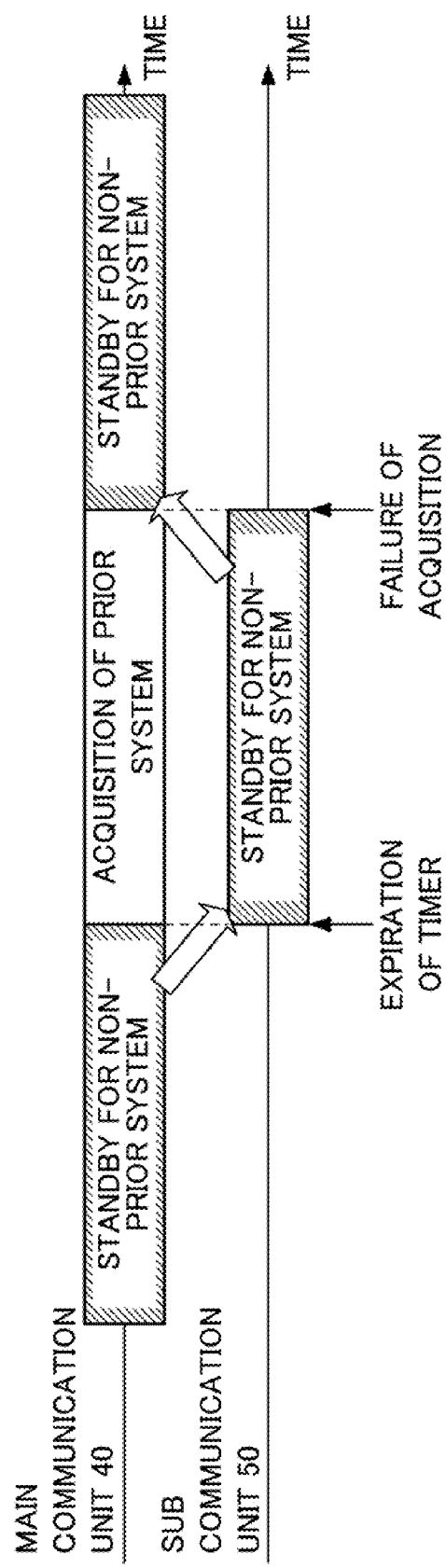
FIG. 9 is a diagram showing a flow of operations of a case in which acquisition of a prior system has failed by the main communication unit in the cellular telephone device according to an example of the preferred embodiment of the present invention.

FIG. 9 shows a flow in which the cellular telephone device 1 fails acquisition of a prior system, and continues the standby for a non-prior system.

Similarly to FIG. 8, on expiration of the timer, the cellular telephone device 1 switches the standby for a non-prior system to the sub communication unit 50 in order to avoid interrupting the standby for the non-prior system. The main communication unit 40 then tries acquisition of a prior system.

Thereafter, when the main communication unit 40 completes the acquisition processing for a prior system, and in a case in which synchronization has failed to be established with any communication system, the cellular telephone device 1 starts the standby for the non-prior system again by the main communication unit 40.

Figure 10:
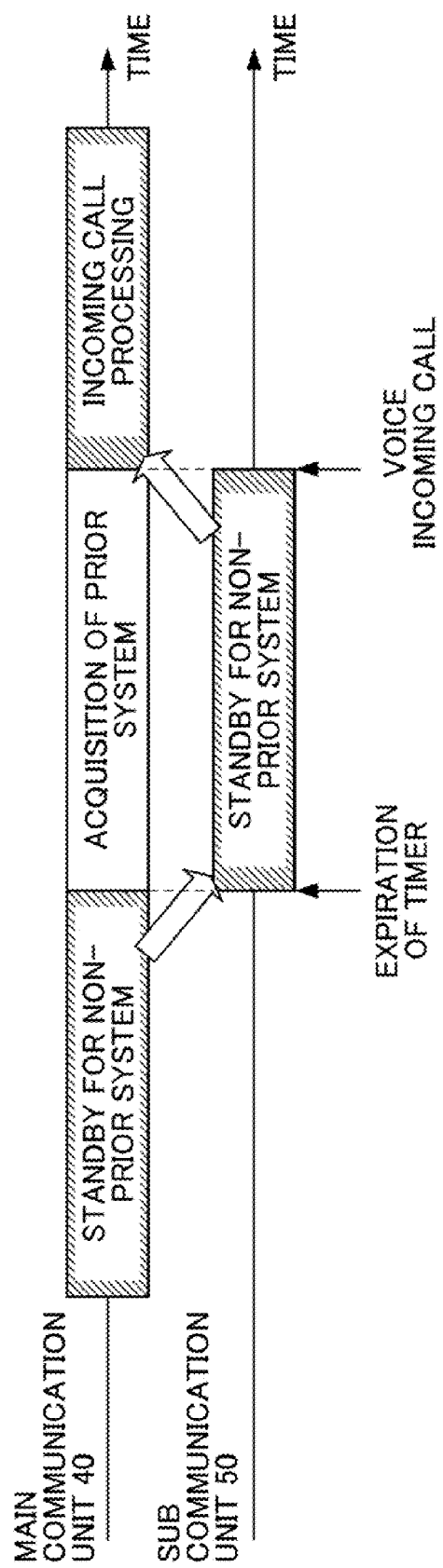
FIG. 10 is a diagram showing a flow of operations of a case in which a voice incoming call has been captured while performing re-selection by the main communication unit in the cellular telephone device according to an example of the preferred embodiment of the present invention.

FIG. 10 shows a flow in which, while the cellular telephone device 1 is performing acquisition of a prior system, a voice incoming call is captured, and then incoming call processing is performed.

Similarly to FIG. 8 or 9, on expiration of the timer, the cellular telephone device 1 switches the standby for a non-prior system to the sub communication unit 50 in order to avoid interrupting the standby for the non-prior system. The main communication unit 40 then tries acquisition of a prior system.

Thereafter, in a case in which the cellular telephone device 1 captures an incoming call in the non-prior system for which the sub communication unit 50 is performing standby, the acquisition of the prior system by the main communication unit 40 is terminated. After switching the main communication unit 40 to the non-prior system, the CPU 60 performs incoming notice processing, and when a response operation is further detected, the main communication unit 40 is caused to transmit an incoming call response in the non-prior system. In other words, the cellular telephone device 1 starts the incoming call processing by the main communication unit 40.

In this way, the incoming call processing is switched to the main communication unit 40, due to the constraint that the sub communication unit 50 is not capable of transmission processing. In other words, if the sub communication unit 50 is configured to have a transmitting means, the incoming call processing can be performed by the sub communication unit 50 as well.

It should be noted that, when the incoming call processing is terminated (termination of an incoming call or termination of a telephone call), the main communication unit 40 may resume the acquisition of the prior system, which has not completed yet. Alternatively, the CPU 60 may continue the standby for the non-prior system by the main communication unit 40, start the count of the timer, and perform re-selection on expiration of the timer. Moreover, in FIG. 10, the incoming call processing may be replaced with outgoing call processing.

Second Embodiment

Figure 11:
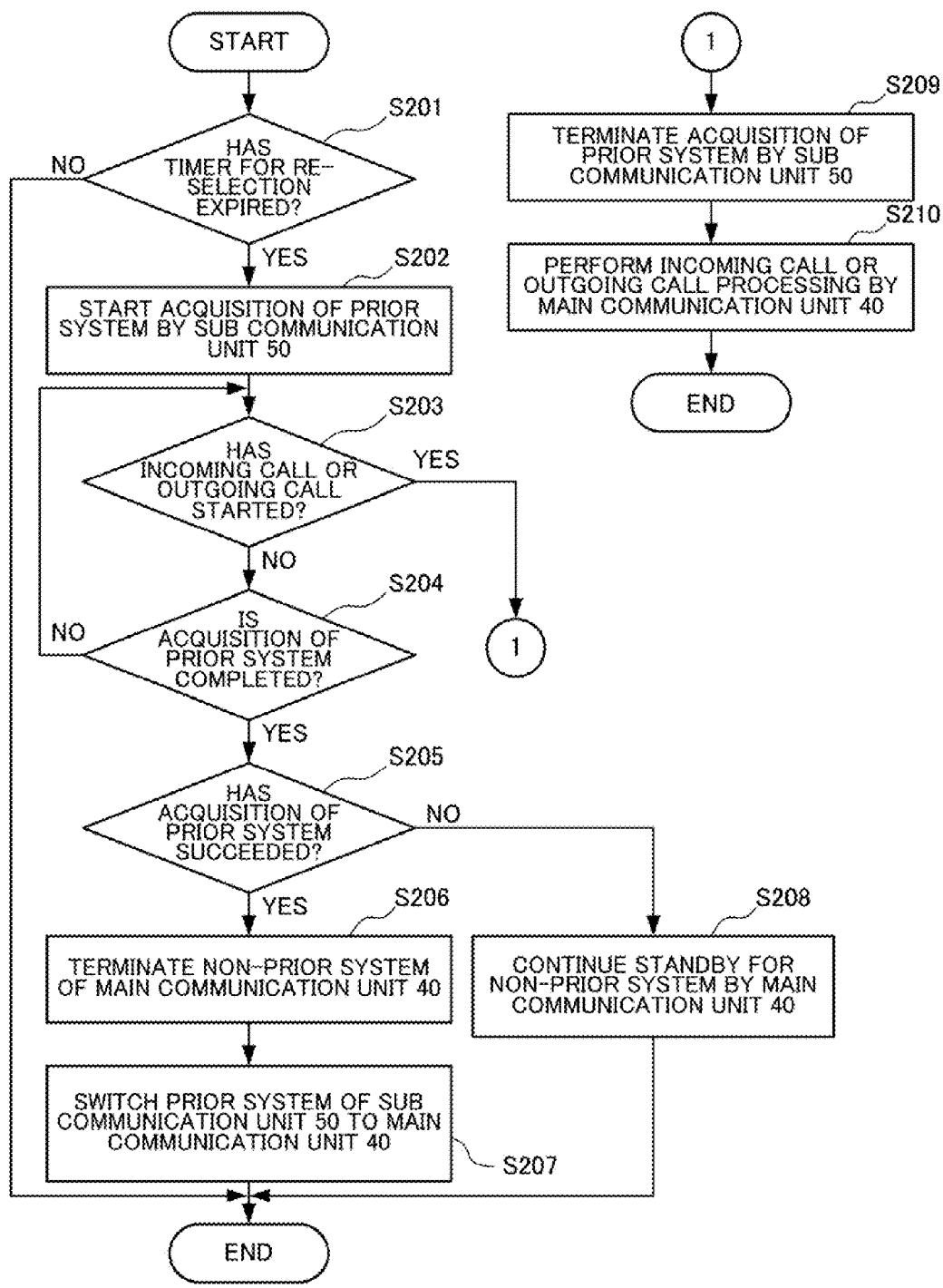
FIG. 11 is a flowchart of a case in which the sub communication unit performs re-selection in the cellular telephone device according to an example of the preferred embodiment of the present invention.

FIGS. 11 to 14 are diagrams showing another aspect of re-selection operations of the cellular telephone device 1 according to an example of a preferred embodiment of the present invention. First, a processing flow is shown in FIG. 11. Here, it is assumed that the cellular telephone device 1 is performing standby for a non-prior system (a communication system other than that at priority level 1).

In Step S201, the CPU 60 determines whether the timer for re-selection has expired, similarly to Step S101. In a case in which the timer has not expired, it is not the timing for re-selection yet, and thus the CPU 60 terminates this processing.

In Step S202, the CPU 60 starts acquisition of a prior system by the sub communication unit 50. More specifically, the CPU 60 sequentially tries acquisition of a communication system with a higher priority level than the priority level of the communication system for which the standby is being performed, similarly to Step S103.

In Step S203, the CPU 60 determines whether there is a request for an incoming/outgoing call in the non-prior system for which the main communication unit 40 is performing standby. More specifically, similarly to Step S104, in a case in which the CPU 60 receives incoming data, the processing proceeds to Step S209 for communication with the non-prior system that had the incoming call to be started.

In Step S204, similarly to Step 105, the CPU 60 determines whether the acquisition processing for a prior system has completed, with there not being an incoming call in Step S203. In a case in which the acquisition processing has completed, the CPU 60 proceeds to processing in Step S205, and in a case in which the acquisition processing has not completed, the CPU 60 repeats determination of Steps S203 and S204.

In Step S205, similarly to Step S106, the CPU 60 determines whether the acquisition processing for a prior system that started in Step S202 has succeeded. In a case in which the acquisition has succeeded, the CPU 60 proceeds to processing in Step S206. On the other hand, in a case in which the acquisition has failed, the CPU 60 proceeds to processing in Step S208.

In Step S206, upon successful acquisition of a prior system, the CPU 60 terminates the standby processing for the non-prior system, which has been performed by the main communication unit 40.

In Step S207, the CPU 60 switches the standby processing for the prior system, which has been determined to be successfully acquired in Step S205, from the sub communication unit 50 to the main communication unit 40. This enables the cellular telephone device 1 to communicate with the prior system, of which acquisition has succeeded, via the main communication unit 40 that is capable of transmission and reception.

This means that the CPU 60 has succeeded in re-selection of a prior system without interrupting the standby for a non-prior system. As a result, the period of time for the cellular telephone device 1 to be in a state of no service can be reduced to a period of time required for switching the standby processing from the sub communication unit 50 to the main communication unit 40, and standby problems such as missing an incoming call can be reduced.

In Step S208, since the acquisition of a prior system by the sub communication unit 50 has failed, the CPU 60 continues the standby for the non-prior system, which is continued by the main communication unit 40.

This enables the CPU 60 to continue the standby for a non-prior system, even in a case in which the re-selection has failed. Moreover, by utilizing the sub communication unit 50, the CPU 60 can try re-selection without interrupting the standby for the communication system with which synchronization has been established.

In Step S209, in response to capturing an incoming call such as a voice call, or an occurrence of outgoing call processing in Step S203, the CPU 60 gives priority to the processing of the incoming/outgoing call, and thus terminates the acquisition processing for a prior system, which is being performed by the sub communication unit 50.

In Step S210, the CPU 60 performs, by the main communication unit 40, incoming call processing or outgoing call processing in the non-prior system. This enables the cellular telephone device 1 to quickly perform communication processing such as a voice call, by using the main communication unit 40 that is capable of both transmission and reception. In other words, the cellular telephone device 1 can continue the standby and monitor for an incoming call and an outgoing call, while performing re-selection.

Figure 12:
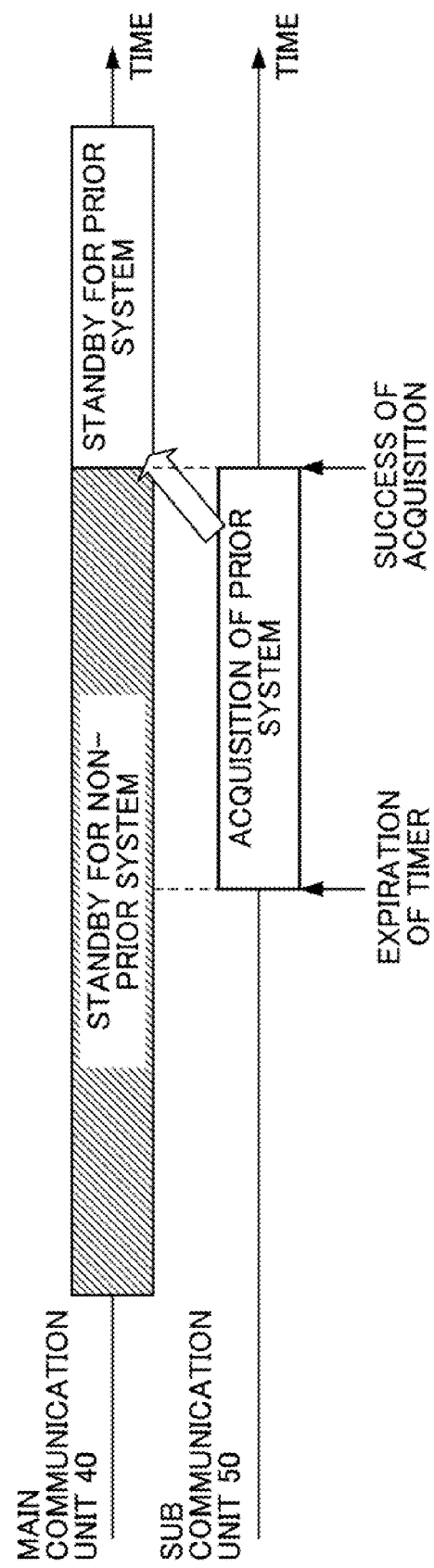
FIG. 12 is a diagram showing a flow of operations of a case in which acquisition of a prior system has succeeded by the sub communication unit in the cellular telephone device according to an example of the preferred embodiment of the present invention.

FIG. 12 shows a flow in which the cellular telephone device 1 succeeds in acquisition of a prior system, and proceeds to standby for the prior system.

Upon expiration of the timer, the cellular telephone device 1 performs acquisition (re-selection) processing for a prior system by the sub communication unit 50 in order to avoid interrupting the standby for the non-prior system.

Thereafter, when the sub communication unit 50 has succeeded in acquisition of a prior system, the standby for the prior system is switched to the main communication unit 40.

Figure 13:
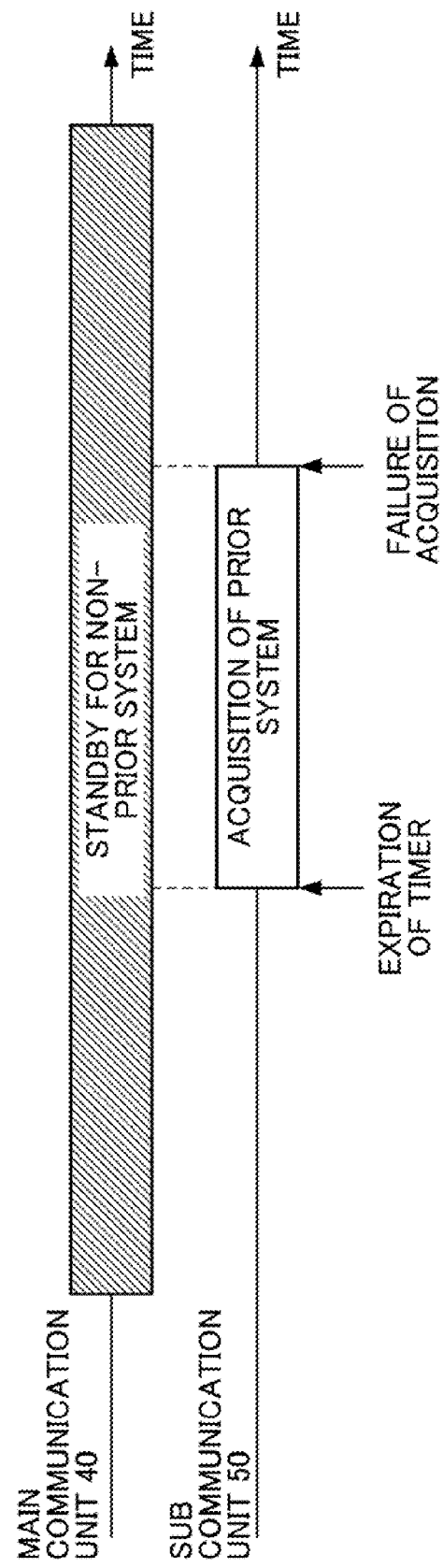
FIG. 13 is a diagram showing a flow of operations of a case in which acquisition of a prior system has failed by the sub communication unit in the cellular telephone device according to an example of the preferred embodiment of the present invention.

FIG. 13 shows a flow in which the cellular telephone device 1 fails acquisition of a prior system, and continues the standby for a non-prior system.

Similarly to FIG. 12, on expiration of the timer, the cellular telephone device 1 tries acquisition of a prior system by the sub communication unit 50 in order to avoid interrupting the standby for the non-prior system.

Thereafter, when the sub communication unit 50 completes the acquisition processing for a prior system, and in a case in which synchronization has failed to be established with any communication system, the main communication unit 40 continues the standby for the non-prior system.

FIG. 14 shows a flow in which, while the cellular telephone device 1 is performing acquisition of a prior system, a voice incoming call is captured, and then incoming call processing is performed.

Similarly to FIG. 12 or 13, on expiration of the timer, the cellular telephone device 1 tries acquisition of a prior system by the sub communication unit 50 in order to avoid interrupting the standby for the non-prior system.

Thereafter, in a case in which the cellular telephone device 1 captures an incoming call in the non-prior system for which the main communication unit 40 is performing standby, the acquisition of the prior system by the sub communication unit 50 is terminated. The CPU 60 performs incoming notice processing, and when a response operation is further detected, the main communication unit 40 is caused to transmit an incoming call response in the non-prior system. In other words, the cellular telephone device 1 starts the incoming call processing by the main communication unit 40.

In this way, the cellular telephone device 1 continues the standby for the non-prior system by the main communication unit 40 that is capable of transmission and reception, and thus is able to continue incoming call processing that also requires an outgoing call operation.

It should be noted that, when the incoming call processing is terminated (termination of an incoming call or termination of a telephone call), the main communication unit 40 may resume the standby for the non-prior system. At this time, the CPU 60 may newly start the count of the timer, and perform re-selection on expiration of the timer, or may immediately start acquisition of a prior system by the sub communication unit 50. Moreover, in FIG. 14, the incoming call processing may be replaced with outgoing call processing.

Although the embodiments of the present invention have been described above, the present invention is not limited to the aforementioned embodiments. Moreover, the effects described in the embodiments of the present invention merely illustrate the most preferable effects arising from the present invention, and the effects according to the present invention are not limited to those described in the embodiments of the present invention.

The invention claimed is:

1. A communication terminal, comprising:
    a first communication unit that transmits and receives a signal with one of a plurality of communication systems via a first antenna;
    a second communication unit that receives a signal from one of the plurality of communication systems via a second antenna; and
    a control unit that switches a communication system to be used in each of the first communication unit and the second communication unit,
    wherein the first communication unit stops being on standby for a first communication system and starts being on standby for a second communication system when the terminal succeeds in an acquisition of the second communication system.

2. The communication terminal according to claim 1, wherein, in a case in which acquisition of the second communication system has succeeded, predetermined processing starts standby for the second communication system in the first communication unit.

3. The communication terminal according to claim 2, wherein the predetermined processing is re-selection processing.

4. The communication terminal according to claim 1, wherein, in a case in which acquisition of the second communication system has failed, the first communication unit performs again the standby for the first communication system.

5. The communication terminal according to claim 1, wherein the second communication unit monitors a paging channel of the first communication system, while the first communication unit is performing acquisition processing for the second communication system.

6. The communication terminal according to claim 5, wherein, in a case in which the second communication unit detects an incoming call while the first communication unit is performing acquisition processing for the second communication system, the first communication unit performs incoming call processing in the first communication system.

7. The communication terminal according to claim 6, wherein, in a case in which the second communication unit detects an incoming call, the incoming call processing is performed after stopping the acquisition processing for the second communication system by the first communication unit.

8. The communication terminal according to claim 1, wherein, in a case in which an outgoing call operation occurs while the first communication unit is performing acquisition processing for the second communication system, the first communication unit performs outgoing call processing in the first communication system after stopping acquisition processing for the second communication system by the first communication unit.

9. A communication terminal, comprising:
- a first communication unit that transmits and receives a signal with one of a plurality of communication systems via a first antenna;
- a second communication unit that receives a signal from one of the plurality of communication systems via a second antenna; and
- a control unit that switches a communication system to be used in each of the first communication unit and the second communication unit,
- wherein the second communication unit starts acquisition of a second communication system with a higher priority than a priority of a first communication system while the first communication unit is on standby for the first communication system, wherein when acquisition of the second communication system by the second communication unit is successful, the control unit switches the first communication unit to be on standby for the second communication system.

10. The communication terminal according to claim 9, wherein, in a case in which acquisition of the second communication system has succeeded, predetermined processing starts standby for the second communication system in the first communication unit.

11. The communication terminal according to claim 10, wherein the predetermined processing is re-selection processing.

12. The communication terminal according to claim 9, wherein, in a case in which acquisition of the second communication system has failed, the first communication unit continues the standby for the first communication system.

13. The communication terminal according to claim 9, wherein the first communication unit monitors a paging channel of the first communication system, while the second communication unit is performing acquisition processing for the second communication system.

14. The communication terminal according to claim 13, wherein, in a case in which the first communication unit detects an incoming call while the second communication unit is performing acquisition processing for the second communication system, the first communication unit continues incoming call processing in the first communication system.

15. The communication terminal according to claim 14, wherein, in a case in which the first communication unit detects an incoming call, the acquisition processing for the second communication system by the second communication unit is stopped.

16. The communication terminal according to claim 9, wherein, in a case in which an outgoing call operation occurs while the second communication unit is performing acquisition processing for the second communication system, acquisition processing for the second communication system by the second communication unit is stopped, and the first communication unit performs outgoing call processing in the first communication system.

17. A communication control method of a communication terminal including a first communication unit that transmits and receives a signal with one of a plurality of communication systems via a first antenna, and a second communication unit that receives a signal from one of the plurality of communication systems via a second antenna, the method comprising the steps of:
- causing the first communication unit to stop being on standby for a first communication system and start being on standby for a second communication system when the terminal succeeds in an acquisition of the second communication system.

* * * * *